(12) United States Patent
Shah et al.

(10) Patent No.: US 11,144,347 B2
(45) Date of Patent: Oct. 12, 2021

(54) PROTECTION DOMAINS FOR PROCESSES IN SHARED ADDRESS SPACE

(71) Applicant: Microsoft Technology Licensing, LLC, Redmond, WA (US)

(72) Inventors: Purvi Shah, Redmond, WA (US); Georgiy I. Reynya, Redmond, WA (US); Stanislav A. Oks, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 86 days.

(21) Appl. No.: 16/545,885

(22) Filed: Aug. 20, 2019

(65) Prior Publication Data

US 2021/0055961 A1    Feb. 25, 2021

(51) Int. Cl.
*G06F 9/46* (2006.01)
*G06F 9/48* (2006.01)
*G06F 9/38* (2018.01)
*G06F 9/50* (2006.01)
*G06F 9/54* (2006.01)

(52) U.S. Cl.
CPC .......... *G06F 9/4881* (2013.01); *G06F 9/3812* (2013.01); *G06F 9/5038* (2013.01); *G06F 9/544* (2013.01)

(58) Field of Classification Search
CPC .... G06F 9/4881; G06F 9/3812; G06F 9/5038; G06F 9/544
See application file for complete search history.

(56) References Cited

U.S. PATENT DOCUMENTS

| | | | | |
|---|---|---|---|---|
| 7,213,247 B1 * | 5/2007 | Wilner | ................ | G06F 9/44521 711/163 |
| 2008/0141266 A1 * | 6/2008 | Hunt | ...................... | G06F 9/544 718/106 |
| 2016/0239430 A1 * | 8/2016 | Tsirkin | ................ | G06F 9/45558 |

OTHER PUBLICATIONS

Chase et al. (Sharing and Protection in a Singl Address Space Operating System), ACM Transactions on Computer Systems, vol. 12, No. 4, Nov. 1994) (Year: 1994).*
"Memory Protection Keys for Userspace", Retrieved From: https://www.kernel.org/doc/Documentation/x86/protection-keys.txt, Retrieved on: Jun. 26, 2019, 2 Pages.

(Continued)

*Primary Examiner* — Wissam Rashid
(74) *Attorney, Agent, or Firm* — Fiala & Weaver P.L.L.C.

(57) ABSTRACT

Methods, systems and computer program products provide protection domains for processes in shared address space. Multiple processes may share address space, for example, in a software isolated process running on top of a library operating system (OS). A protection domain (PD), such as a Protection Key (PKEY), may be assigned to a process to protect its allocated address spaces from access by other processes. PDs may be acquired from a host OS. A library OS may manage PDs to protect processes and/or data. A PD may be freed and reassigned to a different process or may be concurrently assigned to multiple processes, for example, when the number of processes exceeds the number of protection domains. Threads spawned by a process may inherit protection provided by a PD assigned to the process. Process PDs may be disassociated with address spaces as they are deallocated for a process or its threads.

20 Claims, 5 Drawing Sheets

(56) References Cited

OTHER PUBLICATIONS

Mulnix, David, "Intel Xeo Processor Scalable Family Technical Overview", Retrieved From: https://software.intel.com/en-us/articles/intel-xeon-processor-scalable-family-technical-overview, Jul. 10, 2017, 49 Pages.
Aiken, et al., "Deconstructing Process Isolation", In Proceedings of the Workshop on Memory System Performance and Correctness, Oct. 22, 2006, 10 Pages.
Hedayati, et al., "Hodor: Intra-Process Isolation for High-Throughput Data Plain Libraries", In Proceedings of the USENIX Annual Technical Conference, Jul. 10, 2019, pp. 489-503.
Hunt, et al., "Singularity: Rethinking the Software Stack", In Proceedings of the ACM SIGOPS Operating Systems Review, vol. 41, Issue No. 2, Apr. 2007, pp. 37-49.
Park, et al., "libmpk: Software Abstraction for Intel Memory Protection Keys (Intel MPK)", In Proceedings of the USENIX Annual Technical Conference, Jul. 10, 2019, pp. 241-254.
"International Search Report and Written Opinion Issued in PCT Application No. PCT/US20/037693", dated Oct. 2, 2020, 12 Pages.

\* cited by examiner

PROTECTION DOMAINS FOR PROCESSES IN SHARED ADDRESS SPACE

BACKGROUND

Applications that share address space may corrupt process address space, for example, due to overlapping memory operations, e.g., by independently authored applications with undiscovered bugs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems and computer program products provide protection domains for processes in shared address space. Multiple processes may share address space, for example, in a software isolated process running on top of a library operating system (OS). A protection domain (PD), such as a Protection Key (PKEY), may be assigned to a process to protect its allocated address spaces from access (e.g. overwrite corruption) by other processes. PDs may be acquired from a host OS. A library OS may manage PDs to protect processes and/or data (e.g. memory mapped files). A PD may be freed and reassigned to a different process or may be concurrently assigned to multiple processes, for example, when the number of processes exceeds the number of protection domains. Threads spawned by a process may inherit protection provided by a PD assigned to the process. Process PDs may be disassociated with address spaces as they are deallocated for a process or its threads.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
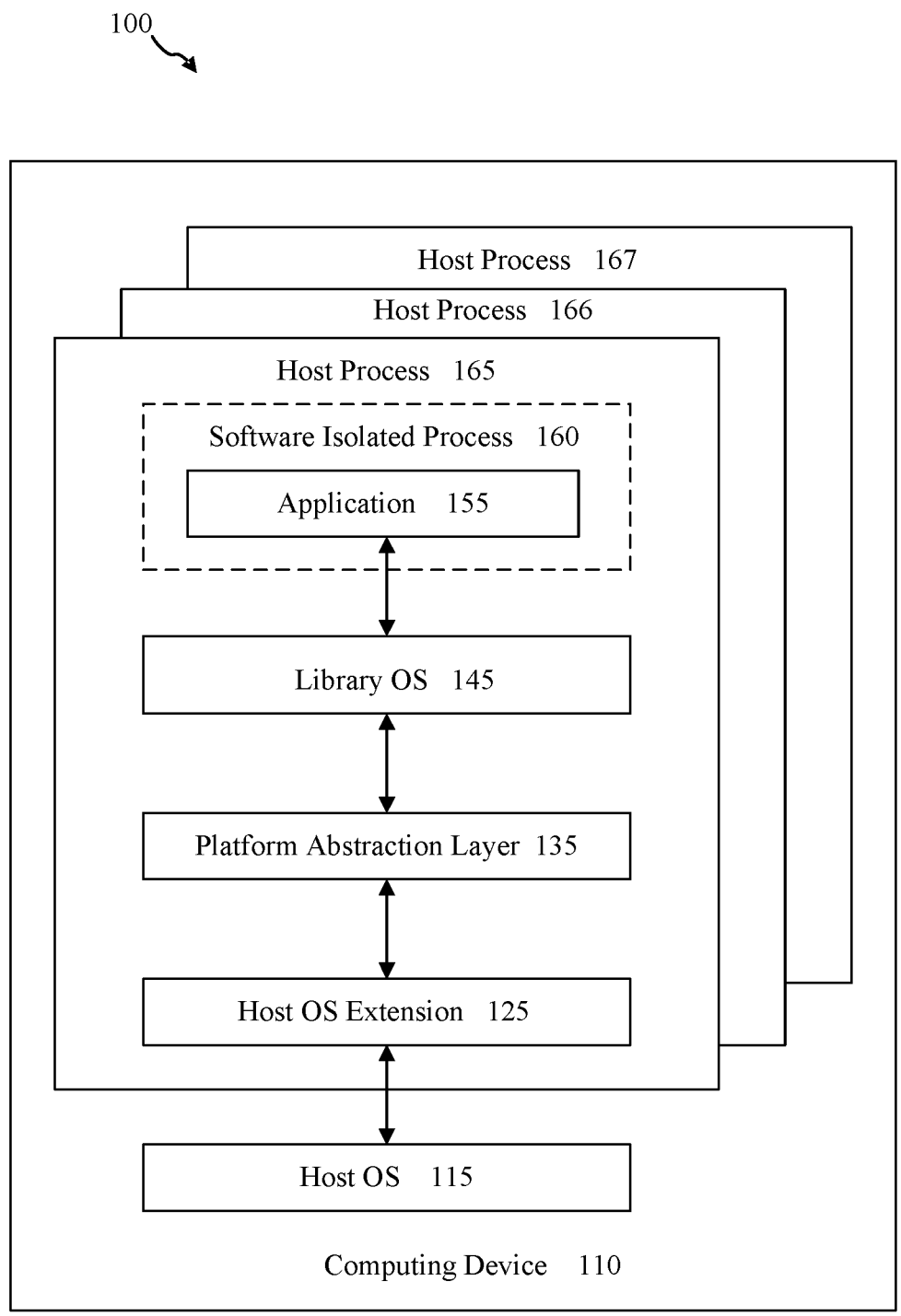
FIG. 1 shows a block diagram of a system for providing protection domains for processes in shared address space, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

Computers may comprise primary and secondary storage. Primary storage may comprise, for example, fast access, but typically volatile (e.g. temporary storage) memory devices, such as random access memory (RAM) internal to a processor (e.g. CPU cache) or external to and directly accessible by a processor (e.g. main memory). Compared to static RAM (SRAM), dynamic RAM (DRAM) may be less costly and use less power, but may need to be refreshed (e.g. thousands of times per second). Primary storage may include some non-volatile (e.g. permanent) memory (e.g.

read-only memory (ROM) devices that store programs called firmware). Secondary storage may comprise, for example, slower access, but larger and non-volatile (e.g. permanent storage) memory devices that may be indirectly accessed by a processor, such as a hard disk drive (HDD), solid state drive (SSD), optical drive, ROM, flash memory, non-volatile memory (NVM) or other non-volatile storage. NVM may be the fastest type of secondary storage (e.g. nearly as fast or a few multiples slower than primary storage).

Computers may be programmed (e.g. with programs) to perform specified functions. An integrated program may comprise multiple programs. A program (e.g. an application) executed by one or more processors (e.g. CPUs) may be referred to as a process. A process may be divided into tasks (e.g. sequences of instructions) that may be executed (e.g. concurrently) as threads. Processes (and threads) may be assigned portions of memory to accomplish their respective functions or tasks. Computer hardware (e.g. a memory management unit (MMU)) and software (e.g. a memory management portion of an operating system (OS) program) may manage memory resources for processes. Primary (main) memory resources may be insufficient for all processes. Secondary memory may supplement primary memory to provide sufficient memory assigned to processes. Available primary and secondary memory may be discontinuous (fragmented).

Virtual memory may simplify processes by appearing to provide each process with its own continuous block of main memory, even though the virtual memory block may actually map to disparate portions of primary and/or secondary memory and even though the total virtual (primary) memory may exceed actual (physical) memory. Virtual memory may (e.g. in addition to simplifying processes) improve process security by isolating process memory. An OS virtual memory manager (VMM) and CPU MMU may manage memory for processes, including mapping from virtual addresses to physical addresses. A process may operate based on virtual memory specified by an OS while a CPU may interface with the OS to fetch and execute instructions from physical (e.g. primary or secondary) memory.

An OS virtual memory manager (VMM) may use paging, for example, to overcome primary memory limitations. A VMM may reserve space on secondary memory to virtually extend primary memory. The reserved area of secondary memory used by an OS as if it were primary memory may be referred to as a page (or paging) file. A VMM may move data between primary and secondary memory (e.g. to or from the paging file in secondary memory), for example, when a process references data stored on secondary memory. Transferring data between primary and secondary memory may be referred to as disc paging or swapping (e.g. paging-in from secondary to primary memory or paging-out from primary to secondary memory), although secondary memory is not limited to a disc. Demand paging may refer to allocating (paging/swapping) primary memory at a thread level, for example, for multiple concurrent processes when there is insufficient primary memory for full processes. A VMM may access (e.g. read or write) data between primary storage and secondary storage in blocks, which may be referred to as pages. Paging algorithms may implement one or more page sizes. Like physical memory, virtual memory may be divided into units called pages. A page may comprise a virtual entity that exists in the form of a page address in a page table. A page in virtual memory may correspond to a page frame array in physical memory.

An OS may maintain a virtual to physical address translation table called a page table for each process. An OS paging supervisor may manage page tables. A page table, which is a data structure, may map virtual page addresses (used by processes) to physical page addresses (used by hardware such as a CPU). A page table may comprise page addresses in an array. Indexes of the array may represent virtual page addresses. Array values (referred to as page table entries (PTEs)) may represent the corresponding page frame addresses in physical memory. A virtual address may comprise a page number (p) and an offset into a page (d). A physical address may comprise a frame number (f) and an offset (d). PTEs may (e.g. also) include process control information, which may indicate, for example, the state and attributes of a process memory, such as validity (e.g. to indicate whether the address refers to a page frame on physical memory), modified data (e.g. to indicate process data has been modified), access protection (e.g. to limit read and/or write access) and process identification. A page directory may reference each page table.

A CPU MMU may have a virtual to physical address translation cache, which may be referred to as a translation lookaside buffer (TLB). A TLB may store recently translated addresses for pages in the page table. An MMU may check the (e.g. faster) TLB before checking the page table. When the translated address exists in the TLB, it is called a TLB Hit, and when a page is not found, it is called a TLB Miss, leading to a page table access in memory and (e.g. if a mapping exists in the page table) writing the mapping to the TLB. A page fault may occur, for example, when a process references a page that is not present in primary memory. An OS may use a page replacement algorithm to determine which pages to swap between primary and secondary memory (e.g. for page faults and/or for swap prefetch).

FIG. 1 shows a block diagram of a system 100 for providing protection domains for processes in shared address space, according to an example embodiment. Example system 100 may comprise, for example, computing device 110, host OS 115 and host processes 165, 166, 167. FIG. 1 presents one of many computing environments that may implement subject matter described herein.

Computing device 110 may comprise any computing device. Computing device 110 may be, for example, any type of stationary or mobile computing device, such as a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Computing device 110 may comprise one or more applications, operating systems, virtual machines, storage devices, etc. that may be executed, hosted, and/or stored therein or via one or more other (e.g. networked) computing devices. In an example, computing device 110 may access one or more server computing devices (e.g. over a network). An example computing device with example features is presented in FIG. 6.

Host OS 115 may comprise any operating system. In an example, host OS may comprise, for example, Microsoft® Windows® NT OS or Linux OS. Host OS 115 runs on computing device 110. A version of host OS 115 may be adapted to run on computing device 110. Host OS 115 may communicate with computing device 110 and host processes 165, 166, 167. Host OS 115 may receive and process system calls from host processes 165, 166, 167. Host OS 115 may, for example, supply protection domains (e.g. through host OS extension 125) to library OS 145 for one or more host processes 165, 166, 167 with multiple processes sharing address space.

Host processes 165, 166, 167 may run in user mode on host OS 115. Host processes 165, 166, 167 may be isolated or non-isolated processes. In an example, host process 165 may comprise a secure container to execute application 155. Host process 165 may comprise, for example, host OS extension (HE) 125, platform abstraction layer (PAL) 135, library OS 145 and application 155.

Host OS extension (HE) 125 may comprise a native host OS application. HE 125 may load and initialize platform abstraction layer 135. In an example, everything above HE 125 may run as a single process with a single address space in user mode. Execution may occur without switching between user mode and kernel mode. HE 125 may communicate with host OS 115 and platform abstraction layer (PAL) 135. HE 125 may receive system calls from PAL 135. HE 125 may make host system calls to host OS 115.

Platform abstraction layer (PAL) 135 may adapt library OS 145 to host OS extension 125 and host OS 115. PAL 135 may load library OS 145. PAL 135 may communicate with library OS 145 and HE 125. PAL 135 may receive and map application binary interface (ABI) calls from Library OS 145 to host system calls handled by HE 125. Calls may relate to protection domains.

Library OS 145 may comprise any operating system. Library OS 145 may be based on a different operating system than host OS 115. In an example, library OS 145 may comprise a user-mode version of Windows® NT while host OS 115 may comprise Linux OS. In an (e.g. another) example, library OS 145 may comprise a user-mode version of Windows® NT while host OS 115 may comprise Windows® NT. In the latter example, platform abstraction layer 135 and host OS extension 125 may be simplified. Library OS 145 may load and initialize application 155 as software isolated process 160, where application 155 runs as a virtual process of library OS 145, comprising a collection of processes, threads and allocations in the same address space. Library OS 145 may communicate with application 155 and PAL 135. Library OS 145 may receive system calls from application 155. Library OS 145 may make application binary interface (ABI) calls to PAL 135.

In an example implementation (e.g. Microsoft® Drawbridge™ or Microsoft® SQLPAL™), library OS 145 may comprise a Windows® NT OS kernel in user-mode (NTUM) that runs as a user-mode library (e.g. ntoskrnl.dll) in host process 165. NTUM may provide the same NT application programming interface (API) as an NT kernel that runs on hardware and in hardware VMs, but NTUM may be much smaller, e.g., by using higher-level abstractions exposed by an ABI. A version of a Win32 subsystem may (e.g. in addition to NTUM) run as a user-mode dynamic runtime library (e.g. DRTL win32k.dll) in host process 165. Many of the DLLs and services from the hardware-based versions of Windows® may be run, e.g., upon the base services of NTUM and the user-mode Win32 subsystem. A memory manager (e.g. Windows® NT virtual memory manager (VMM)) may manage allocations in the address space shared in host process 165.

Application 155 may comprise any application. Application 155 may comprise one or more executable programs, dynamic link libraries (DLLs), etc. Application 155 may comprise one or more applications that, when executed, comprise one or more processes, which (e.g. each) may spawn threads, all of which may execute as software isolated process 160 in a single address space. Application 155 may comprise may different Windows® desktop and server applications that may be run without modification. In an example, application 155 may comprise an SQL Server® application. Application 155 may communicate with library OS 145. Application 155 may make system calls to library OS 145.

Applications (e.g. application 155) may be executed in a variety of secure, isolated (e.g. sandboxed) environments. Sandbox environments may impose limitations on operating system and resource availability to processes. A secure, isolated environment may be created for a process, for example, using a virtual machine (VM), a container or a library OS (LibOS). A VM may virtualize computer hardware to run multiple guest OS instances, with a VM monitor (e.g. host OS or hypervisor) interface for guest OS instances and significant consumption of resources. A container may virtualize an OS, with a container engine interface that permits containers to share the same OS, relatively light consumption of resources and less security than a VM. A LibOS may virtualize (encapsulate) applications or processes to run multiple light guest OS instances (refactored to run as userspace libraries) in the context of isolated applications with an interface to a host OS (e.g. PAL and HE or OS security monitor), relatively light consumption of resources and high security comparable to VMs. FIG. 1 presents an example of the latter (e.g. LibOS) environment.

Executing an application (e.g. application 155) as a software isolated process in a container with a library OS may provide security isolation, host platform compatibility and migration similar to a virtual machine, while providing significant performance benefits and reduced memory footprint by an order-of-magnitude smaller than hardware virtualization. An application run as a software isolated process with a LibOS may (e.g. compared to a VM) provide a much greater density of application workloads on a single host.

Application 155, library OS 145 and associated application APIs and services, PAL 135 and HE 125 may run in the same host process with the same isolated address space.

Host process 165 may comprise, for example, a picoprocess. A picoprocess is a process-based isolation container with a minimal kernel API surface built from an OS process address space with (e.g. all) traditional OS services removed. A minimal process is a process that is not managed by a host OS, which may view it as an empty user-mode address space, while a picoprocess is a minimal process with an associated pico provider kernel-mode driver to manage the empty user-mode address space. A kernel-mode driver may support a picoprocess and act as a broker between a host OS kernel and a library OS in user-mode. In an example with a Linux OS host, pico provider drivers (e.g. lxss.sys, lxcore.sys) may emulate a Linux kernel by translating Linux system calls.

A picoprocess interface may employ high level abstraction, surfacing threads, private virtual memory, and I/O streams instead of low-level hardware abstractions like CPUs, memory management units (MMUs), and device registers in a hardware VM interface. Higher-level abstractions may permit much more efficient resource utilization and implementations of OS code hosted within a picoprocess. In an example, computing device 110 (e.g. a server) may execute a significantly larger number of software isolated applications (e.g. isolated SQL Server® instances) than hardware-based VMs. An application binary interface (ABI) between code running in a picoprocess and host OS may be similar to hardware VMs. In an example, an ABI may comprise a (e.g. closed) set of downcalls with (e.g. fixed) semantics, for example, to provide a stateless interface. ABI calls may be serviced by a host extension or security monitor, which may be similar to a hypervisor or VM monitor in a hardware VM.

Memory corruption may be problematic in multi-process or multi-threaded applications sharing address space, such as in host process 165. Executing an application with an OS kernel converted to a set of libraries in user mode may provide a performance benefit of avoiding switching between user and kernel modes. Sharing address space in user mode may (e.g. however) not distinguish between user and kernel modes to detect and prevent memory corruption. Traditional memory protection has a significant impact on performance (e.g. by requiring page table changes to change protections). Process address space may be protected (e.g. with insignificant impact on performance), for example, by operating different portions of code (e.g. in an application) with different read and write privileges for address spaces.

As will be discussed in reference to FIG. 2, protection domains (PDs) may be used to protect process address spaces in a shared address space, such as host process 165, with little to no impact on performance.

A PD may, for example, affect user-mode access but not kernel-mode access.

In a non-isolated environment where an OS operates in kernel mode, a PD may not be necessary to protect application process overwrites to kernel-mode address space. In an isolated environment with a library OS in user-mode sharing address space with an application, a PD may protect library OS address space from overwrites by application processes.

Process memory PDs may provide internal protection as well as external protection, e.g., protection from unauthorized data access to isolated container information by untrusted code, other containers or privileged/system software. The right to access address space may be determined by a PD associated with a process and its threads. A PD may be implemented without impacting performance, for example, by separating addressability and access from each other. Memory protection may be provided to multiple processes on top of a single address space Library OS. Large integrated applications such as SQL Server® can be run without changes as a software isolated process on a library OS while enforcing protection and maintaining performance.

Figure 2:
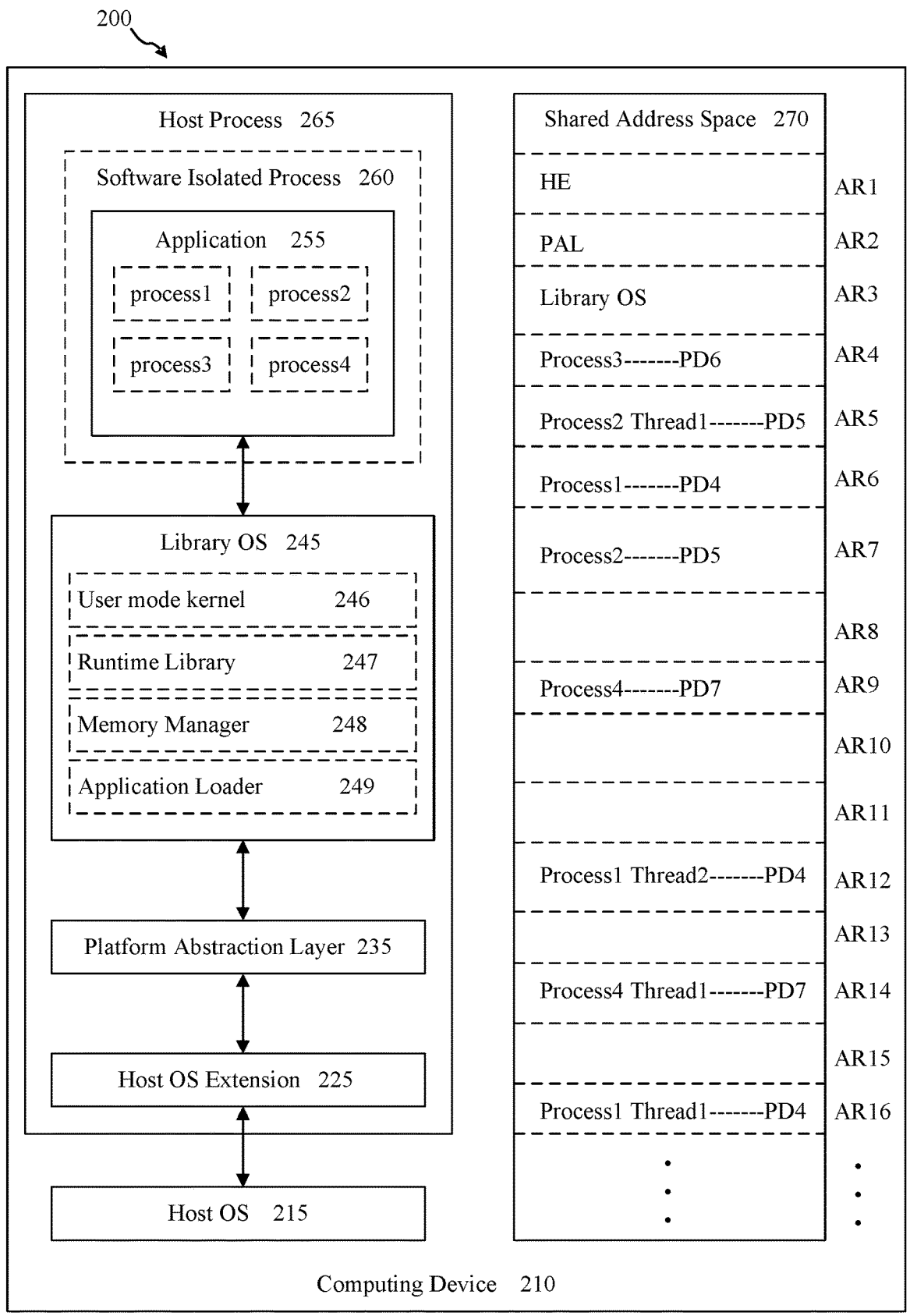
FIG. 2 shows a block diagram of a system for providing protection domains for processes in shared address space, according to an example embodiment.

FIG. 2 shows a block diagram of a system 200 for providing protection domains for processes in shared address space, according to an example embodiment. FIG. 2 shows an example of an isolated host process (e.g. host process 265) and protection of process address spaces within shared address space (e.g. shared address space 270) on computing device 210.

Computing device 210 may comprise any computing device. Computing device 110 may be, for example, any type of stationary or mobile computing device, such as a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Computing device 210 may comprise one or more applications, operating systems, virtual machines, storage devices, etc. that may be executed, hosted, and/or stored therein or via one or more other (e.g. networked) computing devices. In an example, computing device 210 may access one or more server computing devices (e.g. over a network). An example computing device with example features is presented in FIG. 6.

Shared address space 270 may comprise memory allocated by host OS 215 to host process 265. Shared address space 270 may comprise, for example, RAM or virtual memory mapped to RAM of computing device 210.

Application 255 may comprise an integrated application (e.g. an application with multiple applications that, when executed, comprise multiple processes (e.g. application 255 process 1, process2, process3 and process4). In an example, application 255 may comprise, for example, an SQL Server® application, which may comprise, for example (e.g. without limitation), multiple programs and libraries, such as process1 SQLServer.exe and libraries sqllang.dll, sqldk.dll and sqlmin.dll, process2 SQLDumper.exe, process3 FTS.exe and process4 SQLAgent.exe. To application 255, library OS 245 and PAL 235 may appear as a Windows® OS instance with several processes running in its address space and equivalent kernel code that provides services to all components.

Host OS 215 may comprise any operating system. In an example, host OS may comprise, for example, Microsoft® Windows® NT OS or Linux OS. Host OS 215 runs on computing device 210. A version of host OS 215 may be adapted to run on computing device 210. Host OS 215 may communicate with computing device 210 and host processes (e.g. host process 260). Host OS 215 may receive and process system calls from host processes (e.g. host process 260). Host OS 215 may, for example, allocate shared address space 270, supply protection domains (e.g. through HE 225) to library OS 245 to protect process address space in one or more host processes (e.g. host process 260), enable and disable protection domains, etc. In an example, host OS 215 may allocate N protection domains for host process 265.

HE 225 may be part of a single software isolated host OS process (e.g. Host OS process 265) with a single address space (e.g. shared address space 270) allocated by host OS 215. HE 225 may provide an interface between host process 265 and host OS 215. HE 225 may make system calls to host OS 215. In an example, HE 225 may process calls to acquire PDs and to enable and disable access for PDs for use in host process 265. HE 225 may acquire protection domains from host OS 215. HE 225 may, in turn, provide protection domains to library OS 245. HE 225 may provision, reserve or allocate all or a portion of the N protection domains received from host OS 215. HE 225 may communicate with library OS 245 (e.g. through calls mapped by PAL 235), for example, to respond to calls pertaining to protection domains. HE 225 may disable access for PDs (e.g. PKEYs), for example, during initialization of library OS 245. In an example, HE 225 may comprise a boot loader that (e.g. during startup) may instantiate a set of host threads. PDs may be allocated and passed to library OS 245 (e.g. during startup via a loader block).

PDs may be allocated, for example, on demand HE 225 may allocate and configure protection domains, for example, prior to process creation. HE 225 may, for example, allocate a set of PDs and disable access (e.g. write and/or read access) to memory protected by a PD (e.g. even when there may not be any allocations at the time). In an example, a maximum number of PDs may be reserved or configured to protect process address spaces and/or for other purposes (e.g. protecting, at a file-level or page-level, memory mapped files stored on non-volatile memory). PDs may be obtained by library OS 245 from HE 225. HE 225 may account for PDs allocated to library OS 245. HE 225 may "see" a single process and may not be aware of multiple processes for application 255. Library OS 245 may (e.g. accordingly) manage PDs it receives from HE 225. PDs may be reserved for and used by any component with address space, such as library OS 245 and application 255, for example, to protect their respective address space allocations.

A PKEY is one example of a PD. A PKEY may provide a user-accessible, page-level procedure to grant and revoke access permission without impacting performance (e.g. without changing page tables). PKEYs may be used with or without page-based memory permissions in page tables. In contrast to PKEY protection domains, changing permissions in page tables involve time-consuming system calls, TLB shoot downs and misses.

In an example of a PKEY (e.g. as a userspace feature in Intel® Skylake™ Scalable Processor Server CPUs), a page table entry (PTE) may support multiple (e.g. 16) protection domains (e.g. 4 bit PKEY in a 64 bit PTE). A PKEY may be allocated (e.g. prior to use), for example, by using a pkey_alloc( ) system call in Linux, which "tags" an address space (e.g. a page in a page table) with a selected PKEY. A pkey_mprotect system call in Linux may be used to designate access control (e.g. read access, write access) for address space associated with a PKEY. A pkey_free system call in Linux may free memory space (e.g. disassociate it with a PKEY). Permissions may be specified for a (e.g. each) protection domain (PKEY), for example, in a thread-private userspace CPU register, referred to as PKRU. As a CPU register, a PKRU may be thread-local, which may provide a (e.g. each) thread a different set of protections from every other thread for the same memory pages. PKRU permissions may be accessed, for example using read and write instructions (e.g. RDPKRU and WRPKRU). In an example memory access, a PTE in a page table lookup may provide a protection domain (PKEY) for an access while PKRU register content may provide a corresponding domain-specific permission (e.g. to determine whether access permission and write permission are enabled or disabled).

PAL 235 may provide an interface between library OS 245 and HE 225. PAL 235 may, for example, map or adapt ABI calls from library OS 245 to system calls handled by HE 225. In an example, there may be over 800 win32calls, e.g., from gdi32.dll and user32.dll to win32k.dll, over 400 Windows® NT calls, e.g., from ntdll.dll to ntoskrnl.dll (NTUM), and 50 calls from NTUM mapped by PAL 135 to HE 125 or a host security monitor for host OS 115 (e.g. Linux).

Library OS 245 may load applications, manage processes, threads, protection domains and shared address space allocations, receive and process calls from processes and threads, make ABI calls that will be received by PAL 235, etc. Library OS 245 may comprise, for example, user mode (UM) kernel 246, runtime library (RTL) 247, memory manager (MM) 248 and application loader 249. This is an abbreviated list of components in library OS 245. Other components may include, for example, application APIs, services and so on. In an example, components for a Windows® NT library OS may comprise, for example, Windows® NT OS kernel as a user-mode library Ntoskrnl.dll (NTUM), kernel mode windowing and graphics driver as a library Win32k.dll, Graphical device interface (GDI32.dll), User32.dll, Kernel32.dll, NTDLL.dll, Remote Procedure Call Services (RPCSS), Local Security Authority Subsystem Service (LSASS), service control manager (SCM), Remote desktop protocol (RDP)), etc.

Application loader 249 may load and initialize application 255. For example (e.g. as shown in FIG. 2), application loader 249 may load and initialize multiple processes, libraries, etc. (e.g. process 1, process2, process3, process4). In an example, application loader 249 may load an SQL Server® application, which may comprise, for example (e.g. without limitation), multiple programs and libraries, such as process1 SQLServer.exe and libraries sqllang.dll, sqldk.dll and sqlmin.dll, process2 SQLDumper.exe, process3 FTS.exe and process4 SQLAgent.exe.

UM kernel 246 may manage processes and threads. In other words, UM kernel 246 may operate, at least in part, as a process manager. UM kernel 246 may create and manage process objects for processes and thread objects for threads (e.g. for applications loaded by application loader 249). In an example, UM kernel 246 may create and manage tens of thousands of threads for an integrated application, such as SQL Server®. The number of threads may depend on a number of CPU cores in computing device 210. UM kernel 246 may associate a protective domain (PD) with a process and threads spawned by a process. Threads spawned by a process may inherit protection domain rights of the parent process. UM kernel 246 may create, manage and store an association between a process and a PD in a process object. UM kernel 246 may enable protection, for example, when a process is associated with a PD. In an example, UM kernel 246 may call a PKRU write enable instruction wr_pkru (e.g. directly without making an ABI call through HE 225) even though memory may not yet be requested or assigned to the process. Protection may be provided, for example, by disabling access to an address range (AR) for a process and its threads.

A PKEY allocated for a process and its associated (e.g. state) information may be stored, for example, in a process object created for a process (e.g. NTUM_PROCESS_OBJECT) created and managed by library OS 245 (e.g. by user mode kernel 246). A PKEY allocated for a process and its associated (e.g. state) information may (e.g. also) be stored, for example, in a process thread object created for a thread (e.g. NTUM_THREAD_OBJECT) created and managed by library OS 245 (e.g. by user mode kernel 246). A PKEY stored in a process object may be a default PKEY for (e.g. all) pages or virtual address descriptors (VADs) configured for (e.g. all) threads associated with a process object. PKEYs may (e.g. alternatively or additionally) be stored in MM 248.

In an example procedure, a process may be created by UM kernel 246. Library OS 245 and/or HE 225 may manage allocation of PDs to processes. In an example, a call may be issued by UM kernel 246 to HE 225, for example, to select a PD for the newly created process (e.g. current process object—NTUM_PROCESS_OBJECT). A PD may be concurrently or alternatively assigned to multiple processes (e.g. simultaneous assignments, round robin assignments or random assignments), for example, when there are more processes than PDs available. A process may be represented by a current process object (e.g. NTUM_process_object). A PD context may (e.g. also) be stored, for example, in a thread object (e.g. NTUMthreadobject). Access may be enabled to an address range (AR) of (e.g. virtual) memory allocated to a process associated with a PD.

Processes may request allocation and release of address space (e.g. directly) from MM 248. In an example, a process may make a memory request (e.g. to allocate address space to the process). MM 248 may, for example, inspect properties associated with the request and search for a proper address range (AR) among memory shared and owned by the process that satisfies the request. MM 248 may allocate an empty address range and add it to a set of ranges owned by a process (e.g. current process object—NTUM_PROCESS_OBJECT), for example, when an AR is not found in memory owned or shared by the process (e.g. assuming the request does not restrict an allocated address). A PD (e.g. a PKEY) and protection therefore may be set for the allocated AR. Processes and threads may read and write to their allocated ARs (e.g. directly without ABI calls). Processes may allocate and release (e.g. virtual memory) address space (e.g. directly) from MM 248.

A user mode interface (e.g. in library OS 245) may provide application 255 with per thread access. In an example, per thread access may be tied to on stack PageRef. Protection domains (e.g. PKEYs) may be specified per (e.g. virtual memory) page. An interface between application 255 and memory manager 248 may support allocation and deallocation of address spaces and protection domains. Application 255 may access an interface, for example, by loading sqlpal.dll and calling GetProcAddr, or by using QuerySystemInformation with info classes. Default protection of process memory may, for example, use the same interface in library OS 245. A default PD (e.g. PKEY) may be stored, for example, by an address manager for a process (e.g. address manager—NTUM_PROCESS_OBJECT).

Runtime Library (RTL) 247 may, for example, implement a platform extension/abstraction that connects UM kernel 246 and host OS 215.

Memory manager (MM) 248 may manage shared address space 270. MM 248 may reserve, allocate, free and reallocate address ranges (ARs) for processes and threads. A (e.g. each) process and thread may be allocated zero or more address ranges. MM 248 may comprise a virtual memory manager (VMM). Shared address space 270 may represent virtual memory, which may map to primary memory (e.g. RAM) or secondary memory (e.g. NVM). Library OS 245 may use VMM services, for example, instead of calling HE 225. MM 248 may, for example, encapsulate calls to host OS 215 memory manager, such as reserve, commit, free address space and so on.

MM 248 may enable protection for allocated address ranges. MM 248 may be aware of process objects and associated process information, such as process ID and any associated PD. MM 248 may associate an address range allocated to a process with a PD, for example, based on an association between a process and the PD. An association between an AR and a PD may be stored, for example, in an address range object and/or in a virtual address descriptor (VAD). MM 248 may initialize protection for an assigned address range (AR) associated with a PD, for example, by making an ABI system call to set one or more access controls (e.g. read and write PKRU bits) for the AR. PAL 235 and HE 225 may map the ABI call from MM 248 to, for example, to a pkey_mprotect system call in host OS Linux. MM 248 may protect an AR, for example, before providing the AR to a process. MM 248 may add a newly allocated AR to an AR object and/or a VAD indicating an association with a process and PD.

MM 248 may create AR objects for example, during boot/initialization of library OS 245. MM 248 may create a set of AR objects that cover the entire shared address space 270. The number and size of AR objects may be fixed or variable, configurable and/or reconfigurable (e.g. based on application 255). Private ranges within an AR may be reserved for one or more processes. An AR object may manage a set of VADs that describe reserved memory ranges in an AR. MM 248 may comprise an address allocator that searches for free memory range that is not covered by a VAD. A VAD may refer to a range of virtual memory, for example, in terms of a whole number of pages. Pages referred to by a VAD may be committed or free. Various committed pages may be associated with different protection domains. A VAD may track information about each page it owns.

In an example, a page protection database may store page protection domains, which may support exception handling. A protect API may (e.g. alternatively) support application of protection domains to a whole VAD (e.g. memory reservation), which may avoid storing protection domains per page.

PD (e.g. PKEY) access errors (e.g. exceptions) may be handled, for example, by MM 248. A process (e.g. application process 1, process2, process3, process4 and so on) may receive an invalid memory access (e.g. segmentation fault), for example, when the process performs an access that violates a protection domain (e.g. PKEY) access restriction. In an example, a SIGSEGV signal may occur in Linux for an invalid memory access. For example, host OS 215 may, for example, set si_code to SEGV_PKERR. A process and/or thread object may be looked up, for example, to handle exceptions. A process thread may be given a default set of PKEY rights that override the rights from an interrupted context. Rights of an interrupted context may be restored, for example, when a signal handler returns (e.g. completes). HE 215 may report an exception to library OS 245. A PKEY may be restored by library OS 245 (e.g. process PKEY may reset or enabled and other PKEYs may be disabled) for internal use before delivery of an exception. An application (e.g. application 255) may re-establish PKEYs upon entering a signal handler, for example, when PKEY states differ from default states. A PKEY state may be restored (e.g. for exception handling), for example, from a process object or a thread object.

Figure 3:
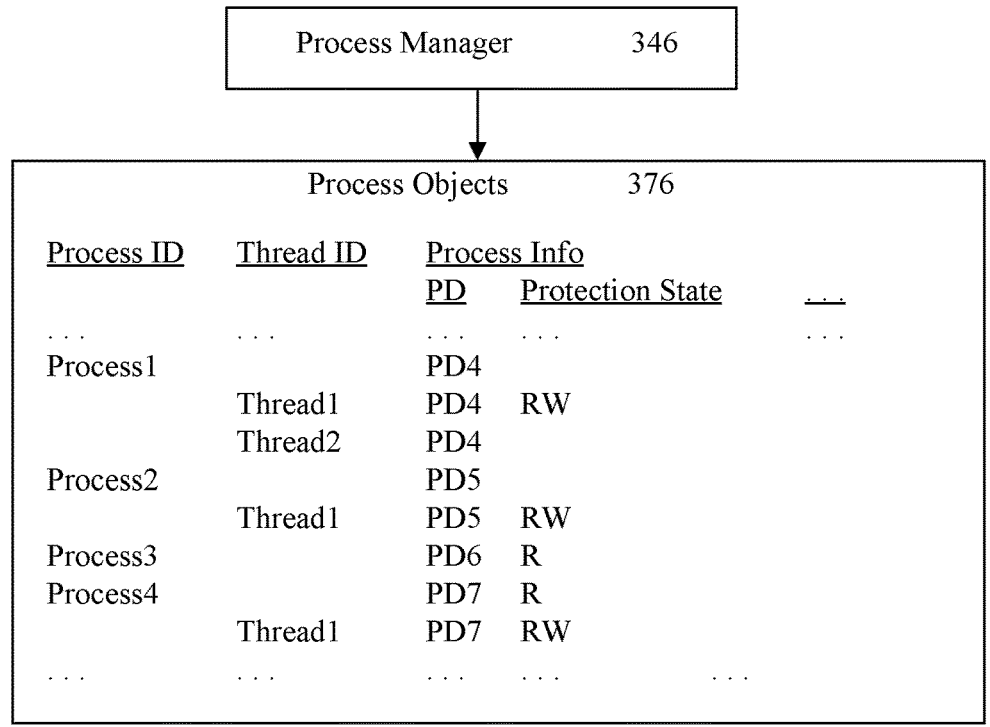
FIG. 3 shows a block diagram of protection domain management for processes in shared address space, according to an example embodiment.
Figure 3:
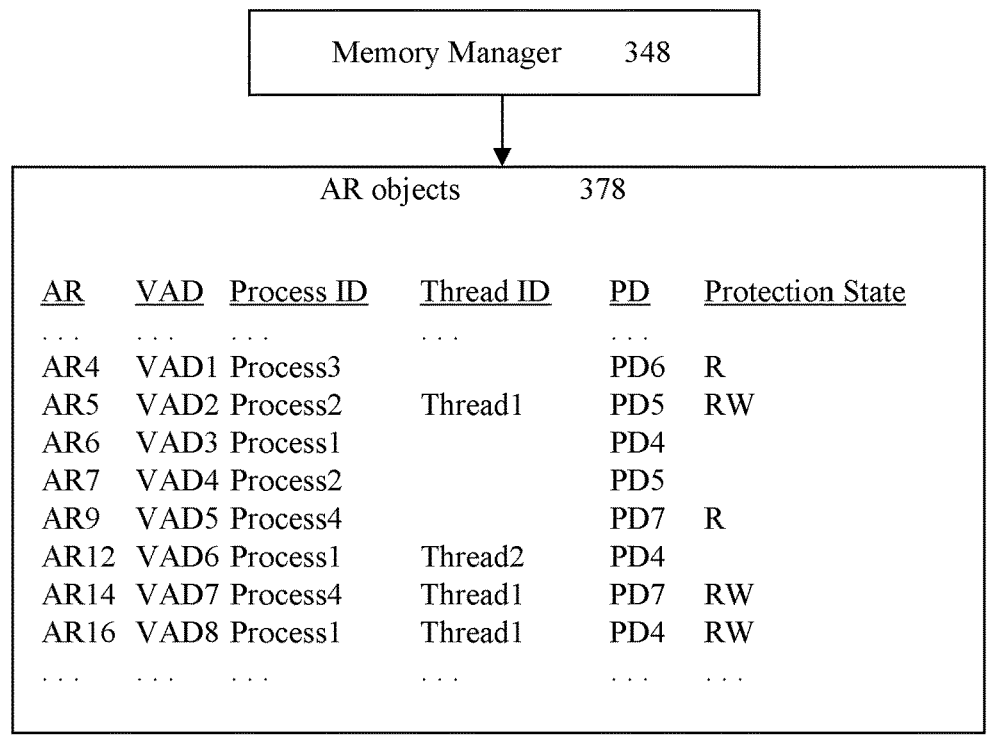

FIG. 3 shows a block diagram of protection domain management for processes in shared address space, according to an example embodiment. FIG. 3 shows an example of process and memory data structures that may be used to manage protection domains. Example protection domain management 300 may be provided by process manager 346 and memory manager 348.

Process manager 346 may manage protection domains associated with processes and threads in software isolated process 260. Process manager 346 may be implemented, for example, by library OS UM kernel 246. Process manager 346 may create and manage one or more objects, such as, for example, process objects data structure 376. A simplified form of process objects 376 is presented to show information that one or more data structures may manage.

Process objects 376 may comprise one or more objects, such as, for example, a process object per process and a thread object per thread. A process object may be created and managed (e.g. by process manager 346) to reflect prevailing associations of processes, threads, PDs and PD states. Process manager 346 may assign PDs to processes. Process manager 346 may assign a process PD to a (e.g. each) thread spawned by a process protected by the process PD. A process object may, for example, manage information about a process ID, a thread ID, process information, such as a PD, a PD protection state, and so on. PD protection state may be configurable, for example, for read access (e.g. read, no read) and write access (e.g. write, no write).

Memory manager 348 may manage protection domains for address space reserved for and allocated to processes and threads in software isolated process 260, e.g., based on protection domains associated with processes and threads. Memory manager 348 may be implemented, for example, by memory manager 248. Memory manager 348 may comprise a VMM. Memory manager 348 may create and manage one or more objects, such as, for example, AR objects data structure 378. A simplified form of AR objects 376 is presented to show information that one or more data structures may manage.

AR objects 376 may comprise one or more objects, for example, an AR object per AR. An AR object may be managed (e.g. by memory manager 348) to reflect prevailing associations of one or more portions of an AR with one or more VADs, processes, threads, PDs and PD states. An AR object may, for example, manage information about an AR, a VAD, a process ID, a thread ID, process information, such as a PD, a PD protection state, and so on.

Example protection domain management 300 presents one of many possible examples. Management of processes, threads, ARs and PDs may be implemented in many other ways. For example, memory manager 348 may link (e.g. in an unordered list), ARs that belong to a process. In an (e.g. another) example, memory manager 348 may link (e.g. in an unordered list), Virtual Address Descriptors (VAD)s for allocations made in ARs that belong to a process.

Implementations are not limited to the examples shown. Any number of computing devices and/or servers (including but not limited to machines and/or virtual machines) may be coupled in any manner via any type of computing environment. For example, one or more of computing device, server or storage components may be co-located, located remote from each other, combined or integrated on or distributed across one or more real or virtual machines. Example system 100, example system 200 or components therein may operate, for example, according to example methods presented in FIGS. 4 and 5.

Figure 4:
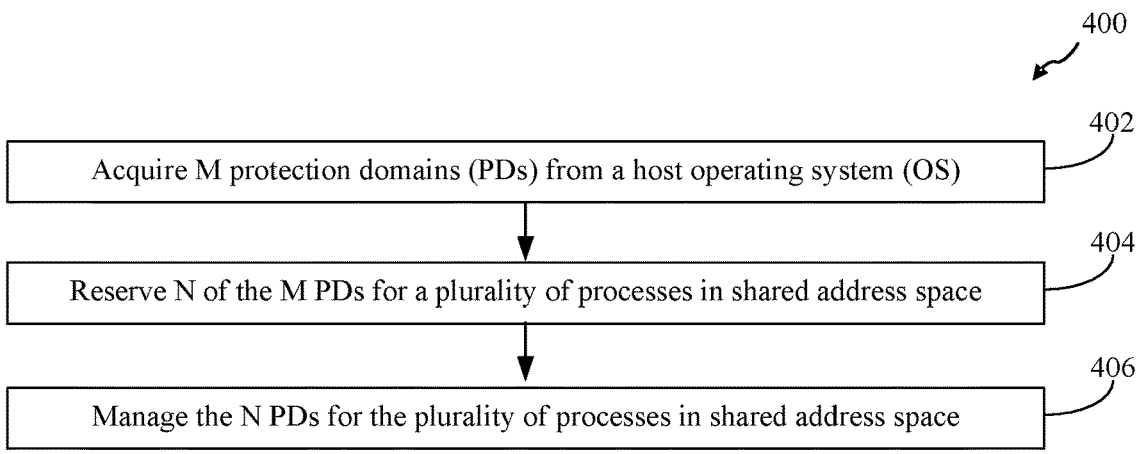
FIG. 4 shows a flowchart of a method for providing protection domains for processes in shared address space, according to an example embodiment.

Embodiments may also be implemented in processes or methods. For example, FIG. 4 shows a flowchart of a method for providing protection domains for processes in shared address space, according to an example embodiment. Embodiments disclosed herein and other embodiments may operate in accordance with example method 400. Method 400 comprises steps 402-406. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 4. FIG. 4 is simply one of many possible embodiments. Embodiments may implement fewer, more or different steps.

Method 400 comprises step 402. In step 402, M protection domains (PDs) may be acquired from a host operating system (OS). For example, as shown in FIG. 2, HE 225 may acquire M PDs from host OS 215.

In step 404, N of the M PDs may be reserved for a plurality of processes in shared address space. For example, as shown in FIG. 2, library OS 245 may reserve N of the M PDs for process 1, process2, process3, process4, etc. in shared address space 270.

In step 406, the N PDs for the plurality of processes may be managed in shared address space. For example, as shown in FIG. 3, the N PDs for process 1, process2, process3, process4, etc. may be managed by process manager 346.

Figure 5:
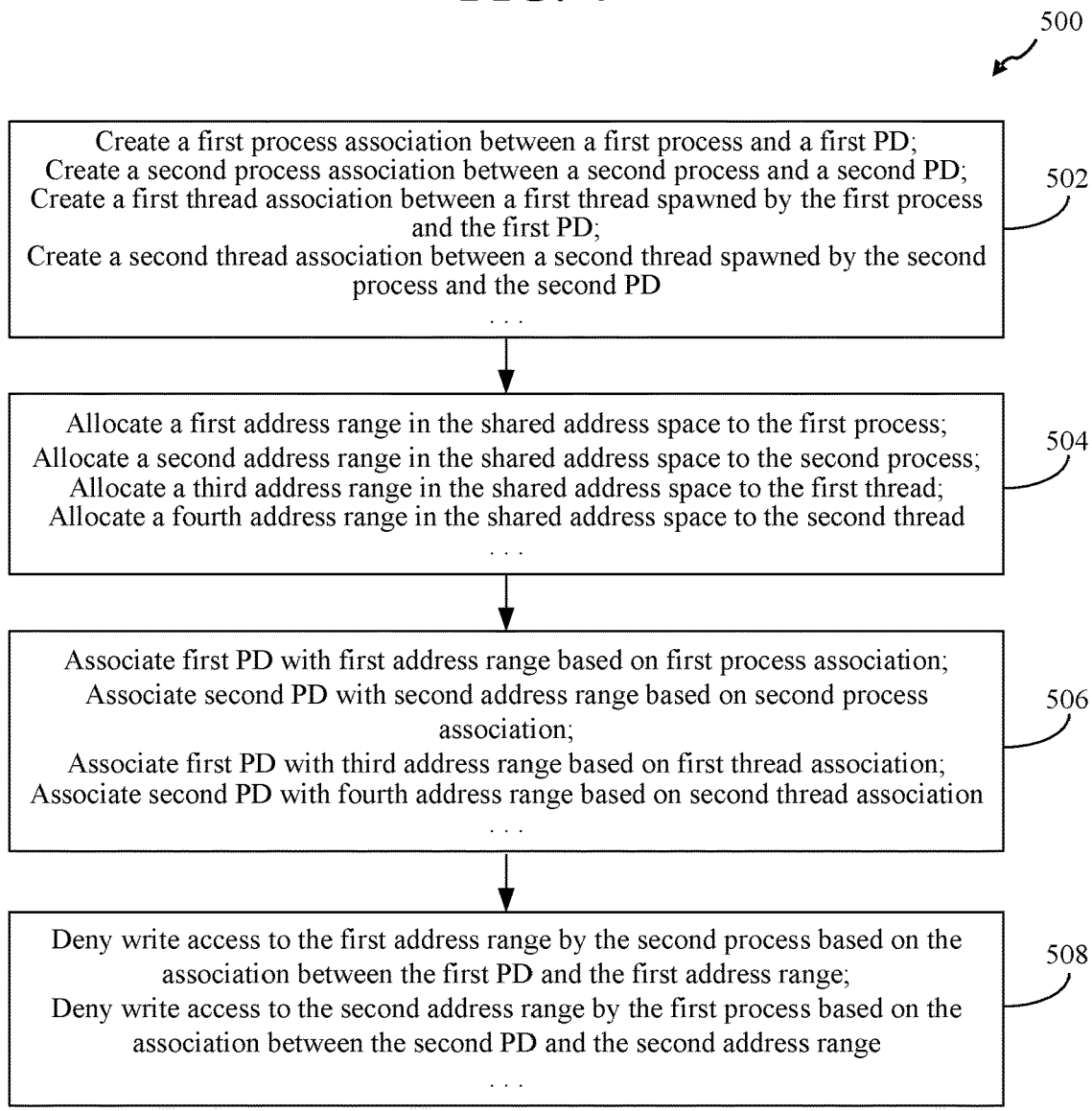
FIG. 5 shows a flowchart of a method for providing protection domains for processes in shared address space, according to an example embodiment.

FIG. 5 shows a flowchart of a method for providing protection domains for processes in shared address space, according to an example embodiment. Embodiments disclosed herein and other embodiments may operate in accordance with example method 500. Method 500 comprises steps 502-508. However, other embodiments may operate according to other methods. Other structural and operational embodiments will be apparent to persons skilled in the relevant art(s) based on the foregoing discussion of embodiments. No order of steps is required unless expressly indicated or inherently required. There is no requirement that a method embodiment implement all of the steps illustrated in FIG. 5. FIG. 5 is simply one of many possible embodiments. Embodiments may implement fewer, more or different steps.

Method 500 comprises step 502. In step 502, a first process association may be created between a first process and a first PD; a second process association may be created between a second process and a second PD; a first thread association may be created between a first thread spawned by the first process and the first PD; and a second thread association may be created between a second thread spawned by the second process and the second PD. For example, as shown in FIGS. 2 and 3, process associations are created between process1 and PD4 and between process2 and PD5. Thread associations are created between process1 thread1 and PD4 and between porcess2 thread1 and PD5.

In step 504, a first address range in the shared address space may be allocated to the first process; a second address range in the shared address space may be allocated to the second process; a third address range in the shared address space may be allocated to the first thread; and a fourth address range in the shared address space may be allocated to the second thread. For example, as shown in FIGS. 2 and 3, memory manager 348 may commit or allocate all or a portion of AR6, which may be reserved for process1, to process1, as may be reflected by VAD3. Memory manager 348 may commit or allocate all or a portion of AR7, which may be reserved for process2, to process2, as may be reflected by VAD4. Memory manager 348 may commit or allocate all or a portion of AR16, which may be reserved for process1, to process1 thread1, as may be reflected by VAD8. Memory manager 348 may commit or allocate all or a portion of AR5, which may be reserved for process2, to process2 thread1, as may be reflected by VAD2.

In step 506, a first PD may be associated with a first address range based on a first process association; a second PD may be associated with a second address range based on a second process association; a first PD may be associated with a third address range based on a first thread association; a second PD may be associated with a fourth address range based on a second thread association. For example, as shown in FIGS. 2 and 3, memory manager 348 may associate PD4 with the portion of AR6 allocated to process 1 based on the association of PD4 with process 1. Memory manager 348 may associate PD5 with the portion of AR7 allocated to process2 based on the association of PD5 with process2. Memory manager 348 may associate PD4 with the portion of AR16 allocated to process 1 thread1 based on the association of PD4 with process 1. Memory manager 348 may associate PD5 with the portion of AR5 allocated to process2 thread1 based on the association of PD5 with process2.

In step 508, write access to the first address range by the second process may be denied based on the association between the first PD and the first address range; and write access to the second address range by the first process may be denied based on the association between the second PD and the second address range. For example, as shown in FIGS. 2 and 3, memory manager 248 or 348 may deny write access to AR6 by process2 based on the association between PD4 and AR6. Memory manager 248 or 348 may deny write access to AR7 by process1 based on the association between PDS and AR7.

III. Example Computing Device Embodiments

As noted herein, the embodiments described, along with any modules, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 6:
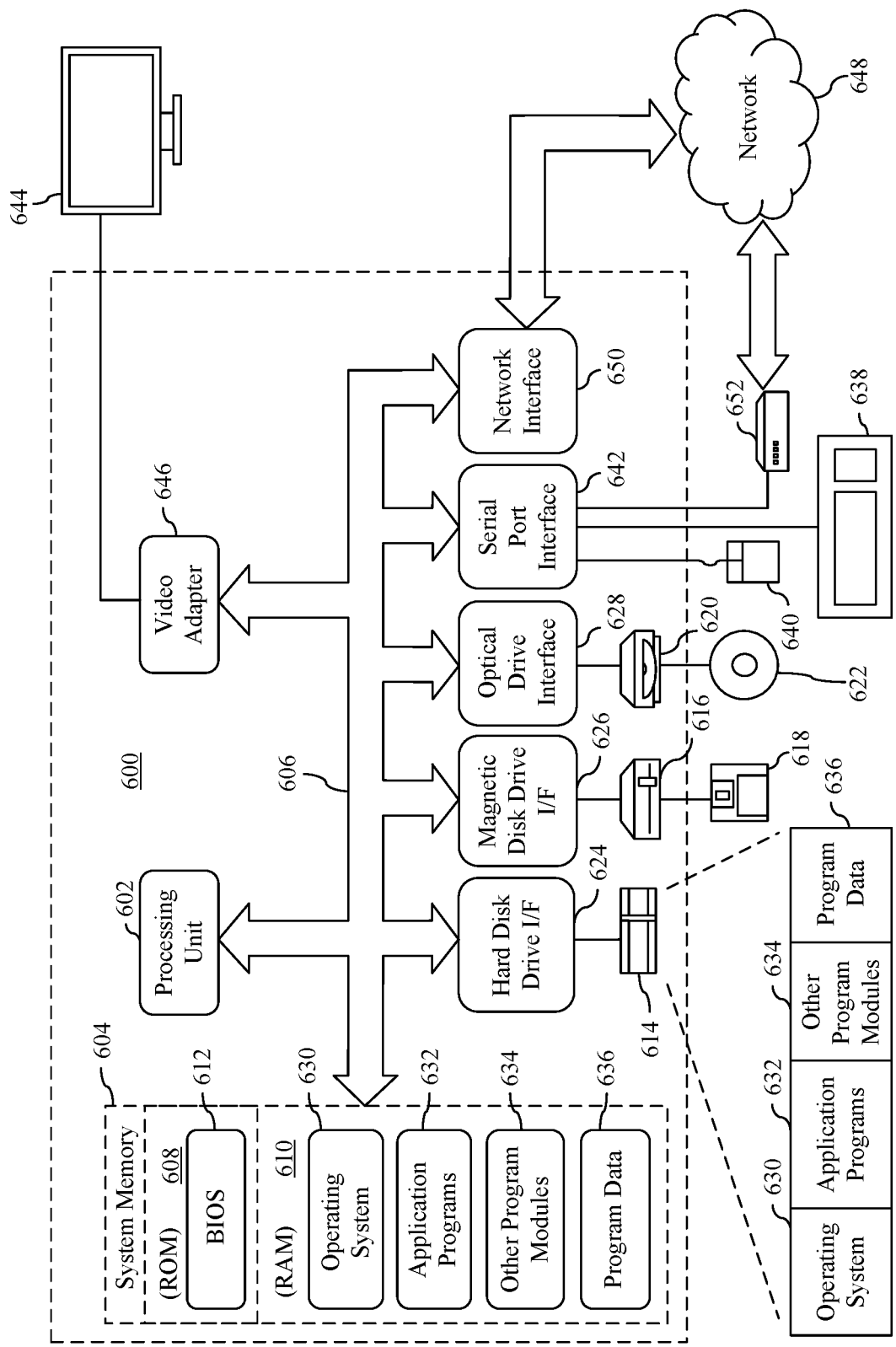
FIG. 6 shows a block diagram of an example computing device that may be used to implement example embodiments.

FIG. 6 shows an exemplary implementation of a computing device 600 in which example embodiments may be implemented. Consistent with all other descriptions provided herein, the description of computing device 600 is a non-limiting example for purposes of illustration. Example embodiments may be implemented in other types of computer systems, as would be known to persons skilled in the relevant art(s).

As shown in FIG. 6, computing device 600 includes one or more processors, referred to as processor circuit 602, a system memory 604, and a bus 606 that couples various system components including system memory 604 to processor circuit 602. Processor circuit 602 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 602 may execute program code stored in a computer readable medium, such as program code of operating system 630, application programs 632, other programs 634, etc. Bus 606 represents one or more of any of several types of bus structures, including a memory bus or memory controller, a peripheral bus, an accelerated graphics port, and a processor or local bus using any of a variety of bus architectures. System memory 604 includes read only memory (ROM) 608 and random-access memory (RAM) 610. A basic input/output system 612 (BIOS) is stored in ROM 608.

Computing device 600 also has one or more of the following drives: a hard disk drive 614 for reading from and writing to a hard disk, a magnetic disk drive 616 for reading from or writing to a removable magnetic disk 618, and an optical disk drive 620 for reading from or writing to a removable optical disk 622 such as a CD ROM, DVD ROM, or other optical media. Hard disk drive 614, magnetic disk drive 616, and optical disk drive 620 are connected to bus 606 by a hard disk drive interface 624, a magnetic disk drive interface 626, and an optical drive interface 628, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 630, one or more application programs 632, other programs 634, and program data 636. Application programs 632 or other programs 634 may include, for example, computer program logic (e.g., computer program code or instructions) for implementing example embodiments described herein.

A user may enter commands and information into the computing device 600 through input devices such as keyboard 638 and pointing device 640. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 602 through a serial port interface 642 that is coupled to bus 606, but may be connected by other interfaces, such as a parallel port, game port, or a universal serial bus (USB).

A display screen 644 is also connected to bus 606 via an interface, such as a video adapter 646. Display screen 644 may be external to, or incorporated in computing device 600. Display screen 644 may display information, as well as being a user interface for receiving user commands and/or other information (e.g., by touch, finger gestures, virtual keyboard, etc.). In addition to display screen 644, computing device 600 may include other peripheral output devices (not shown) such as speakers and printers.

Computing device 600 is connected to a network 648 (e.g., the Internet) through an adaptor or network interface 650, a modem 652, or other means for establishing communications over the network. Modem 652, which may be internal or external, may be connected to bus 606 via serial port interface 642, as shown in FIG. 6, or may be connected to bus 606 using another interface type, including a parallel interface.

As used herein, the terms "computer program medium," "computer-readable medium," and "computer-readable storage medium" are used to refer to physical hardware media such as the hard disk associated with hard disk drive 614, removable magnetic disk 618, removable optical disk 622, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media that are separate and non-overlapping with embodiments directed to computer-readable storage media.

As noted above, computer programs and modules (including application programs 632 and other programs 634) may be stored on the hard disk, magnetic disk, optical disk, ROM, RAM, or other hardware storage medium. Such computer programs may also be received via network interface 650, serial port interface 642, or any other interface type. Such computer programs, when executed or loaded by an application, enable computing device 600 to implement features of example embodiments described herein. Accordingly, such computer programs represent controllers of the computing device 600.

Example embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

Methods, systems and computer program products provide protection domains for processes in shared address space. Multiple processes may share address space, for example, in a software isolated process running on top of a library operating system (OS). A protection domain (PD), such as a Protection Key (PKEY), may be assigned to a process to protect its allocated address spaces from access (e.g. overwrite corruption) by other processes. PDs may be acquired from a host OS. A library OS may manage PDs to protect processes and/or data (e.g. memory mapped files). A PD may be freed and reassigned to a different process or may be concurrently assigned to multiple processes, for example, when the number of processes exceeds the number of protection domains. Threads spawned by a process may inherit protection provided by a PD assigned to the process. Process PDs may be disassociated with address spaces as they are deallocated for a process or its threads.

In an example, a method for managing a plurality of protection domains (PDs) for a plurality of processes in shared address space may comprise, for example, creating a first process association between a first process in the plurality of processes and a first PD in the plurality of PDs; creating a second process association between a second process in the plurality of processes and a second PD in the plurality of PDs; allocating a first address range in the shared address space to the first process; allocating a second address range in the shared address space to the second process; associating the first PD with the first address range based on the first process association; and associating the second PD with the second address range based on the second process association.

In an example, the plurality of processes may be executed within a software isolated process associated with the shared address space.

In an example, the method may further comprise, for example, acquiring the plurality of PDs from a host/platform OS by a library operating system (OS) in the software isolated process associated with the shared address space. The library OS may create the first and second process associations, the association between the first address range and first process, and the association between the second address range and the second process.

In an example, the host OS and the library OS may be based on different OSs.

In an example, acquiring a plurality of PDs may comprise, for example, acquiring the plurality of PDs through at least one of: an abstraction layer in the software isolated process between the library OS and the host OS; and a host OS extension that runs host OS native code in the software isolated process.

In an example, the method may further comprise, for example, creating a first process object for the first process, wherein the first process association is associated with the first process object; and creating a second process object for the second process, wherein the second process association is associated with the second process object.

In an example, the method may further comprise, for example, denying write access to the first address range by the second process based on the association between the first PD and the first address range; and denying write access to the second address range by the first process based on the association between the second PD and the second address range.

In an example, the method may further comprise, for example, creating a first thread association between a first thread spawned by the first process, and the first PD based on the first process association; creating a second thread association between a second thread spawned by the second process, and the second PD based on the second process association; allocating a third address range in the shared address space to the first thread; allocating a fourth address range in the shared address space to the second thread; associating the first PD with the third address range based on the first thread association; and associating the second PD with the fourth address range based on the second thread association.

In an example, the method may further comprise, for example, disassociating the first PD from the third address range in response to a deallocation of the third address range.

In an example, the method may further comprise, for example, creating a third process association between a third process in the plurality of processes and the first PD in the plurality of PDs when a quantity of the plurality of processes exceeds a quantity of the plurality of PDs.

In an example, the first process association and the third process association may concurrently exist.

In an example, the plurality of PDs may be specified by a plurality of protective keys (PKEYs).

In an example, a computing device may comprise, for example, one or more processors; and one or more memory devices that store program code configured to be executed by the one or more processors, the program code comprising: (a) a process manager configured to: manage a plurality of process protection domains (PDs) for a plurality of processes in shared address space; create a first process association between a first process in the plurality of processes and a first PD in the plurality of PDs; create a second process association between a second process in the plurality of processes and a second PD in the plurality of PDs; and (b) a memory manager configured to: allocate a first address range in the shared address space to the first process; allocate a second address range in the shared address space to the second process; associate the first PD with the first address range based on the first process association; and associate the second PD with the second address range based on the second process association.

In an example, the memory manager may be further configured to: deny write access to the first address range by the second process based on the association between the first PD and the first address range; and deny write access to the second address range by the first process based on the association between the second PD and the second address range.

In an example, the process manager may be further configured to: create a first thread association between a first thread spawned by the first process, and the first PD based on the first process association; and create a second thread association between a second thread spawned by the second process, and the second PD based on the second process association; and the memory manager may be further configured to: allocate a third address range in the shared address space to the first thread; allocate a fourth address range in the shared address space to the second thread; associate the first PD with the third address range based on the first thread association; and associate the second PD with the fourth address range based on the second thread association.

In an example, the memory manager may be further configured to:

disassociate the first PD with the third address range in response to a deallocation of the third address range.

In an example, the process manager and the memory manager may be in a software isolated process configured to provide isolation to the plurality of processes in the shared address space.

In an example, a computer-readable storage medium may have program instructions recorded thereon that, when executed by a processing circuit, perform a method comprising: providing a software isolated process that provides isolation to a plurality of processes in shared address space; managing a plurality of process protection domains (PDs) for the plurality of processes in the shared address space; creating a first process association between a first process in the plurality of processes and a first PD in the plurality of PDs; creating a first thread association between a first thread spawned by the first process, and the first PD based on the first process association; creating a second process association between a second process in the plurality of processes and a second PD in the plurality of PDs; and creating a second thread association between a second thread spawned by the second process, and the second PD based on the second process association.

In an example, the computer-readable storage medium may further comprise: allocating a first address range in the shared address space to the first process; allocating a second address range in the shared address space to the second process; associating the first PD with the first address range based on the first process association; associating the second PD with the second address range based on the second process association; allocating a third address range in the shared address space to the first thread; allocating a fourth address range in the shared address space to the second thread; associating the first PD with the third address range based on the first thread association; and associating the second PD with the fourth address range based on the second thread association.

In an example, the computer-readable storage medium may further comprise:

denying write access to the first address range by the second process based on the association between the first PD and the first address range; and denying write access to the second address range by the first process based on the association between the second PD and the second address range.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method performed by at least one computing device for managing a plurality of protection domains (PDs) for a plurality of processes with shared address space, comprising:

creating a first process association between a first process in the plurality of processes and a first PD in the plurality of PDs;

creating a second process association between a second process in the plurality of processes and a second PD in the plurality of PDs;

allocating a first address range in the shared address space to the first process;

allocating a second address range in the shared address space to the second process;

associating the first PD with the first address range based on the first process association;

associating the second PD with the second address range based on the second process association; and creating a third process association between a third process in the plurality of processes and the first PD in the plurality of PDs when a quantity of the plurality of processes exceeds a quantity of the plurality of PDs.

2. The method of claim 1, wherein the plurality of processes are executed within a software isolated process associated with the shared address space.

3. The method of claim 2, further comprising:

acquiring the plurality of PDs from a host/platform OS by a library operating system (OS) in the software isolated process associated with the shared address space;

wherein the library OS creates the first and second process associations, the association between the first address range and first process, and the association between the second address range and the second process.

4. The method of claim 3, wherein the host OS and the library OS are based on different OSs.

5. The method of claim 4, wherein acquiring the plurality of PDs comprises:

acquiring the plurality of PDs through at least one of:
an abstraction layer in the software isolated process between the library OS and the host OS; and
a host OS extension that runs host OS native code in the software isolated process.

6. The method of claim 1, further comprising:

creating a first process object for the first process, wherein the first process association is associated with the first process object; and creating a second process object for the second process, wherein the second process association is associated with the second process object.

7. The method of claim 1, further comprising:

denying write access to the first address range by the second process based on the association between the first PD and the first address range; and denying write access to the second address range by the first process based on the association between the second PD and the second address range.

8. The method of claim 1, further comprising:

creating a first thread association between a first thread spawned by the first process, and the first PD based on the first process association;

creating a second thread association between a second thread spawned by the second process, and the second PD based on the second process association;

allocating a third address range in the shared address space to the first thread;

allocating a fourth address range in the shared address space to the second thread;
associating the first PD with the third address range based on the first thread association; and
associating the second PD with the fourth address range based on the second thread association.

9. The method of claim 8, further comprising:
disassociating the first PD from the third address range in response to a deallocation of the third address range.

10. The method of claim 1, wherein the first process association and the third process association concurrently exist.

11. The method of claim 1, wherein the plurality of PDs are specified by a plurality of protective keys (PKEYs).

12. A computing device, comprising:
one or more processors; and
one or more memory devices that store program code configured to be executed by the one or more processors, the program code comprising:
a process manager configured to:
manage a plurality of process protection domains (PDs) for a plurality of processes in shared address space;
create a first process association between a first process in the plurality of processes and a first PD in the plurality of PDs; and
create a second process association between a second process in the plurality of processes and a second PD in the plurality of PDs; and
a memory manager configured to:
allocate a first address range in the shared address space to the first process;
allocate a second address range in the shared address space to the second process;
associate the first PD with the first address range based on the first process association; and
associate the second PD with the second address range based on the second process association;
wherein the plurality of PDs are specified by a plurality of protective keys (PKEYs) and wherein access and write permissions are specified for each of the PKEYs in a register of the one or more processors.

13. The computing device of claim 12, wherein the memory manager is further configured to:
deny write access to the first address range by the second process based on the association between the first PD and the first address range; and
deny write access to the second address range by the first process based on the association between the second PD and the second address range.

14. The computing device of claim 13, wherein the process manager is further configured to:
create a first thread association between a first thread spawned by the first process, and the first PD based on the first process association; and
create a second thread association between a second thread spawned by the second process, and the second PD based on the second process association; and
the memory manager is further configured to:
allocate a third address range in the shared address space to the first thread;
allocate a fourth address range in the shared address space to the second thread;
associate the first PD with the third address range based on the first thread association; and
associate the second PD with the fourth address range based on the second thread association.

15. The computing device of claim 14, wherein the memory manager is further configured to:
disassociate the first PD with the third address range in response to a deallocation of the third address range.

16. The computing device of claim 15, wherein the process manager and the memory manager are in a software isolated process configured to provide isolation to the plurality of processes in the shared address space.

17. A computer-readable storage medium having program instructions recorded thereon that, when executed by a processing circuit, perform a method for managing a plurality of protection domains (PDs) for a plurality of processes with a shared address space, comprising:
creating a first process association between a first process in the plurality of processes and a first PD in the plurality of PDs;
creating a first thread association between a first thread spawned by the first process, and the first PD based on the first process association;
creating a second process association between a second process in the plurality of processes and a second PD in the plurality of PDs;
creating a second thread association between a second thread spawned by the second process, and the second PD based on the second process association;
allocating a first address range, a second address range, a third address range, and a fourth address range in the shared address space to the first process, the second process, the first thread, and the second thread, respectively; and
associating the first PD with the first address range based on the first process association, the second PD with the second address range based on the second process association, the first PD with the third address range based on the first thread association, and the second PD with the fourth address range based on the second thread association.

18. The computer-readable storage medium of claim 17, further comprising:
denying write access to the first address range by the second process based on the association between the first PD and the first address range; and
denying write access to the second address range by the first process based on the association between the second PD and the second address range.

19. The computing device of claim 12, wherein the process manager is further configured to create a third process association between a third process in the plurality of processes and the first PD in the plurality of PDs when a quantity of the plurality of processes exceeds a quantity of the plurality of PDs.

20. The computer-readable storage medium of claim 17, wherein the plurality of PDs are specified by a plurality of protective keys (PKEYs) and wherein access and write permissions are specified for each of the PKEYs in a register of the processing circuit.

* * * * *